US009633180B2

(12) United States Patent
Stewart

(10) Patent No.: US 9,633,180 B2
(45) Date of Patent: Apr. 25, 2017

(54) PROCESSING SYSTEM WITH REGISTER ARBITRATION AND METHODS FOR USE THEREWITH

(71) Applicant: ViXS Systems, Inc., Toronto (CA)

(72) Inventor: Norman Vernon Douglas Stewart, Toronto (CA)

(73) Assignee: VIXS SYSTEMS, INC., Toronto (CA)

( * ) Notice: Subject to any disclaimer, the term of this patent is extended or adjusted under 35 U.S.C. 154(b) by 241 days.

(21) Appl. No.: 14/266,287

(22) Filed: Apr. 30, 2014

(65) Prior Publication Data

US 2014/0328407 A1 Nov. 6, 2014
US 2015/0161361 A9 Jun. 11, 2015

Related U.S. Application Data

(63) Continuation of application No. 12/907,223, filed on Oct. 19, 2010, now Pat. No. 8,811,497, which is a continuation-in-part of application No. 12/490,777, filed on Jun. 24, 2009, now Pat. No. 8,781,127, application No. 14/226,287, which is a continuation-in-part of application No. 14/048,391, filed on Oct. 8, 2013, which is a continuation of application No. 12/651,996, filed on Jan. 4, 2010, (Continued)

(51) Int. Cl.
| | |
|---|---|
| *H04N 13/00* | (2006.01) |
| *G06F 21/10* | (2013.01) |
| *G06F 21/79* | (2013.01) |
| *H04N 19/44* | (2014.01) |
| *H04N 19/40* | (2014.01) |
| *H04N 19/103* | (2014.01) |
| *H04N 19/124* | (2014.01) |

(52) U.S. Cl.
CPC .............. *G06F 21/10* (2013.01); *G06F 21/79* (2013.01); *H04N 19/103* (2014.11); *H04N 19/124* (2014.11); *H04N 19/40* (2014.11); *H04N 19/44* (2014.11)

(58) Field of Classification Search
CPC ..... H04N 7/26; H04N 3/1575; H04N 5/37213
USPC ..................................... 375/240.25
See application file for complete search history.

(56) References Cited

U.S. PATENT DOCUMENTS 4,412,281 A * 10/1983 Works ........................... 714/4.5
6,189,082 B1 * 2/2001 Ramamurthy ............... 711/202
(Continued)

FOREIGN PATENT DOCUMENTS

EP 2161671 A2 * 3/2010

*Primary Examiner* — Jeffery Williams
(74) *Attorney, Agent, or Firm* — Garlick & Markison; Bruce E. Stuckman

(57) ABSTRACT

A processing system includes a memory module that includes a register space for storing a plurality of register data in a plurality of registers and secure access data corresponding to the register space. A register arbitration module operates to receive a request to access one of the registers from a client module; retrieve secure access data corresponding to the client to determine if the client is trusted; and to grant the request to access the register if the client is trusted. If the client is not trusted, the register arbitration module retrieves secure access data to determine if the register is non-secured for the client. The register arbitration module grants the request to access the register when the register is non-secured for the client.

20 Claims, 8 Drawing Sheets

Related U.S. Application Data now Pat. No. 8,594,333, which is a continuation-in-part of application No. 12/490,777, filed on Jun. 24, 2009, now Pat. No. 8,781,127.

(60) Provisional application No. 61/094,541, filed on Sep. 5, 2008.

(56) References Cited

U.S. PATENT DOCUMENTS

| | | | |
|---|---|---|---|
| 2008/0172712 A1* | 7/2008 | Munetsugu | 725/118 |
| 2008/0256643 A1* | 10/2008 | Jones et al. | 726/27 |
| 2010/0017893 A1* | 1/2010 | Foley et al. | 726/34 |

* cited by examiner

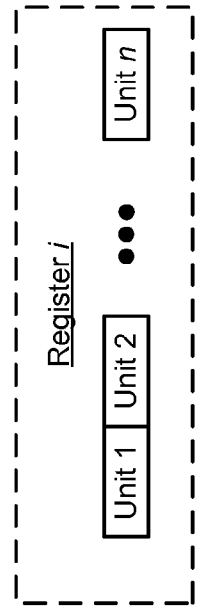
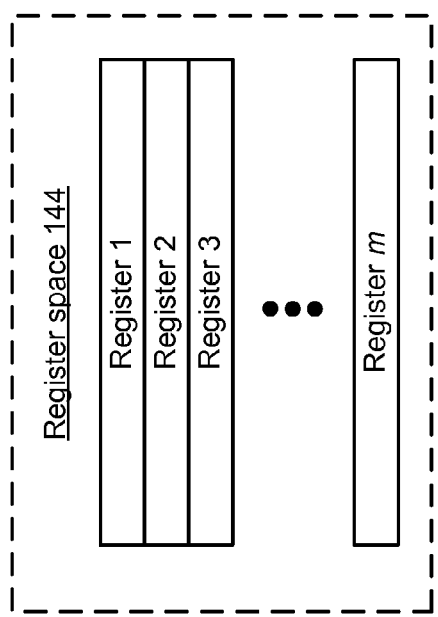
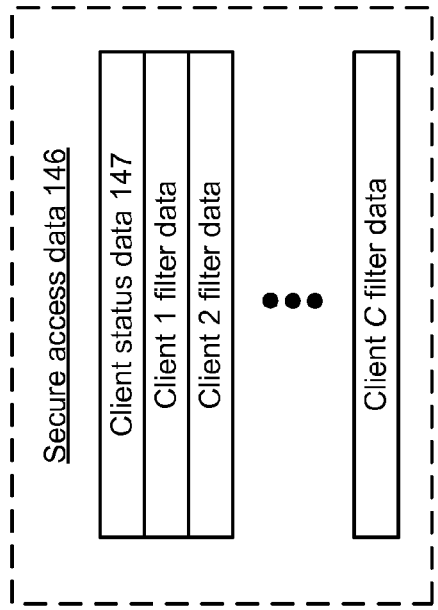
FIG. 3
FIG. 4
FIG. 5

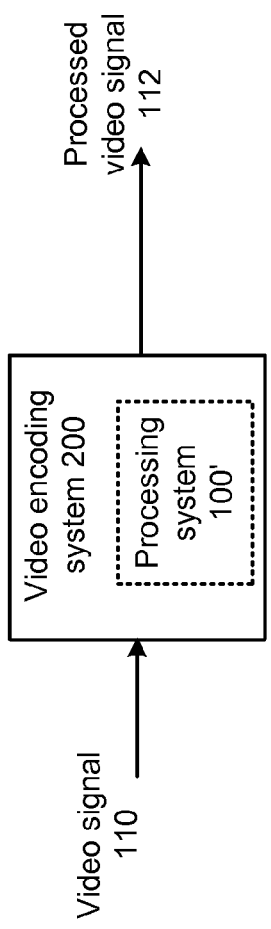
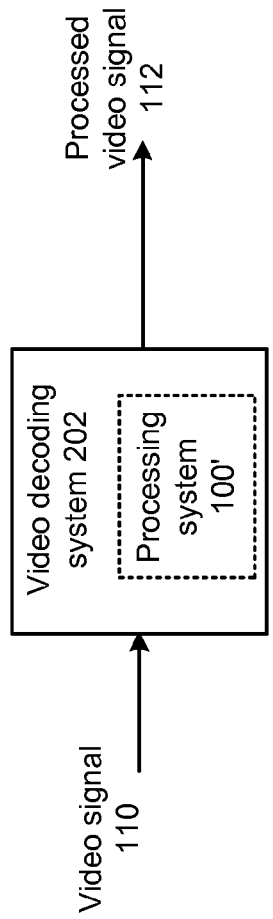
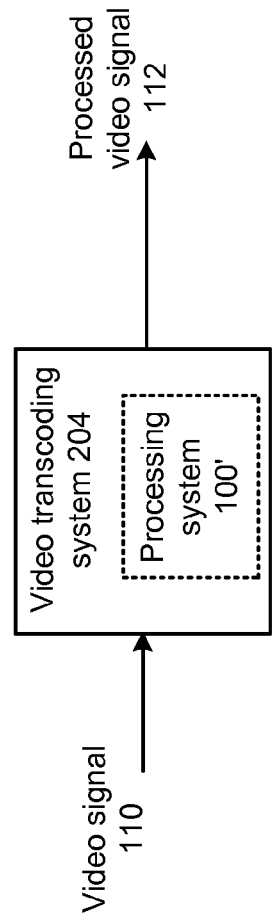
FIG. 7
FIG. 8
FIG. 9

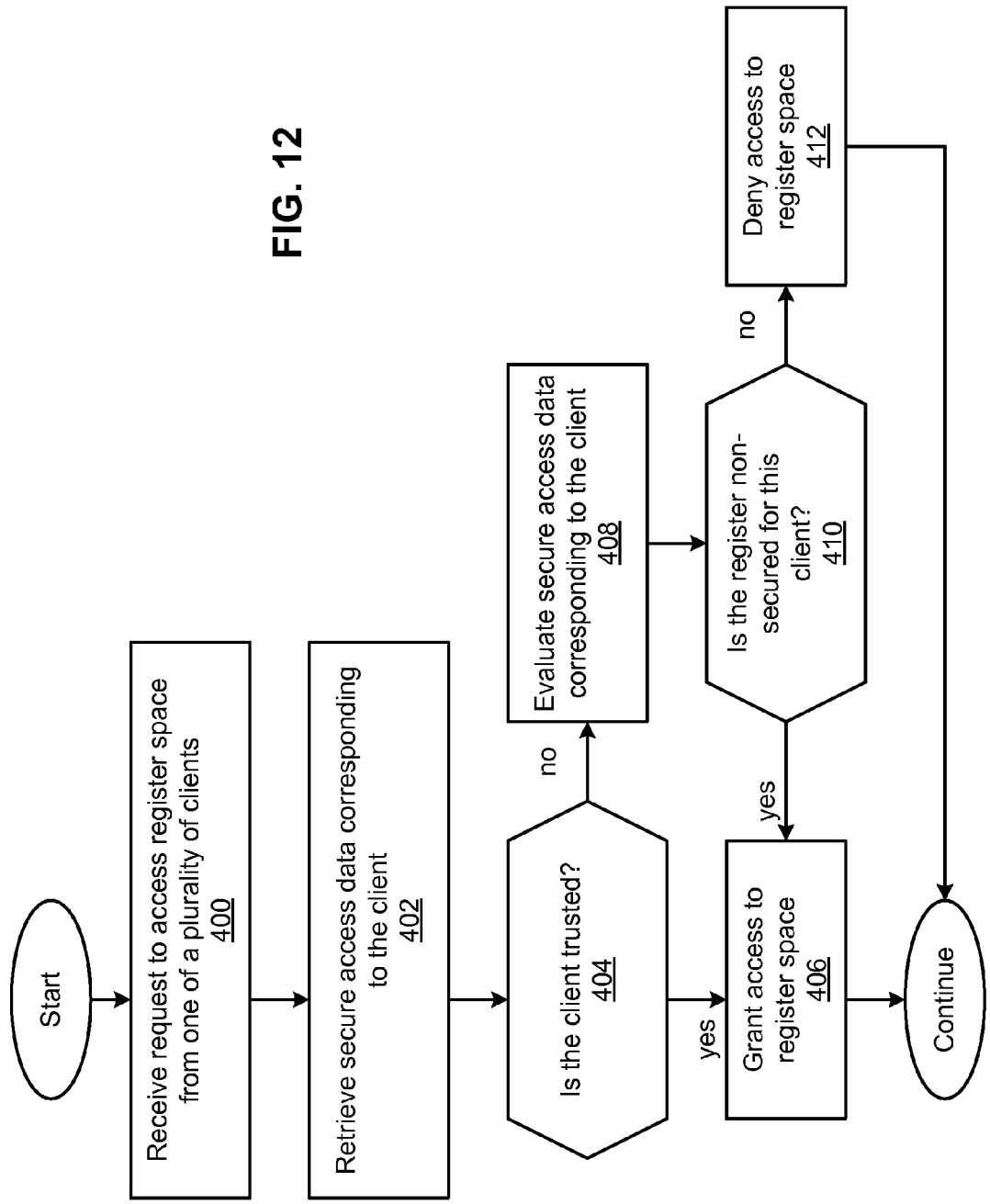

PROCESSING SYSTEM WITH REGISTER ARBITRATION AND METHODS FOR USE THEREWITH

CROSS REFERENCE TO RELATED PATENTS

The present U.S. Utility Patent Application claims priority pursuant to 35 U.S.C. §120 as a continuation of U.S. Utility application Ser. No. 12/907,223, entitled "PROCESSING SYSTEM WITH REGISTER ARBITRATION AND METHODS FOR USE THEREWITH", filed Oct. 19, 2010, which is a continuation-in-part of U.S. Utility application Ser. No. 12/490,777, entitled "DEVICE WITH PRIVILEGED MEMORY AND APPLICATIONS THEREOF", filed Jun. 24, 2009, issued as U.S. Pat. No. 8,781,127 on Jul. 15, 2014, which claims priority pursuant to 35 U.S.C. §119(e) to U.S. Provisional Application No. 61/094,541, entitled "METHODS FOR SYSTEM ON A CHIP CRYPTOGRAPHIC KEY ACCESS AND STORAGE", filed Sep. 5, 2008, all of which are hereby incorporated herein by reference in their entirety and made part of the present U.S. Utility Patent Application for all purposes.

The present U.S. Utility Patent Application also claims priority pursuant to 35 U.S.C. §120 as a continuation-in-part of U.S. Utility application Ser. No. 14/048,391, entitled "SECURE KEY ACCESS WITH ONE-TIME PROGRAMMABLE MEMORY AND APPLICATIONS THEREOF," filed Oct. 8, 2014, which is a continuation of U.S. Utility application Ser. No. 12/651,996, entitled "SECURE KEY ACCESS WITH ONE-TIME PROGRAMMABLE MEMORY AND APPLICATIONS THEREOF," filed Jan. 4, 2010, issued as U.S. Pat. No. 8,594,333 on Nov. 26, 2013, which is a continuation-in-part of U.S. Utility application Ser. No. 12/490,777, entitled "DEVICE WITH PRIVILEGED MEMORY AND APPLICATIONS THEREOF", filed Jun. 24, 2009, issued as U.S. Pat. No. 8,781,127 on Jul. 15, 2014, which claims priority pursuant to 35 U.S.C. §119(e) to U.S. Provisional Application No. 61/094,541, entitled "METHODS FOR SYSTEM ON A CHIP CRYPTOGRAPHIC KEY ACCESS AND STORAGE", filed Sep. 5, 2008.

TECHNICAL FIELD OF THE INVENTION

The present invention relates to security in processing devices.

DESCRIPTION OF RELATED ART

Processing systems can include operating system programs that allow utilities and application programs to be written for a common computing environment, even when executed on different processing platforms. Operating systems also provide for multitasking that allows the simultaneous execution of multiple applications and utilities, etc. Examples of such operating systems include Microsoft Windows, Mac OS, Linux and Solaris. The flexibility of these operating systems provides several drawbacks. For instance, authors of malicious code such as viruses, worms, Trojan horses and other harmful code have taken advantage of the open nature of operating systems such as Microsoft windows.

Certain multimedia content, such as music compact disks (CDs), video cassettes and digital video disks (DVDs) are recorded with copy protection signals that are meant to prevent the multimedia content contained on these media from being copied. These copy protection mechanisms can provide challenges to the compression and encoding techniques used by many processing systems. In many such circumstances, the copy protection is be temporarily disabled in the processing system when this content is processed, transmitted or stored.

Processing systems typically include memory registers for facilitating the communication of data between devices of the systems. Memory registers are one point of vulnerability for malicious code. In addition, improper access to memory registers during the processing video applications can provide an authorized access to media content in an unprotected format.

Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIG. 3 presents a block diagram representation of a register space 144 in accordance with a further embodiment of the present invention.

FIG. 4 presents a block diagram representation of a register in accordance with a further embodiment of the present invention.

FIG. 5 presents a block diagram representation of secure access data 146 in accordance with a further embodiment of the present invention.

FIG. 7 presents a block diagram representation of a video encoding system 200 in accordance with an embodiment of the present invention.

FIG. 8 presents a block diagram representation of a video decoding system 202 in accordance with an embodiment of the present invention.

FIG. 9 presents a block diagram representation of a video transcoding system 204 in accordance with an embodiment of the present invention.

FIG. 12 presents a flowchart representation of a method in accordance with an embodiment of the present invention.

DETAILED DESCRIPTION OF THE INVENTION INCLUDING THE PRESENTLY PREFERRED EMBODIMENTS

Figure 1:
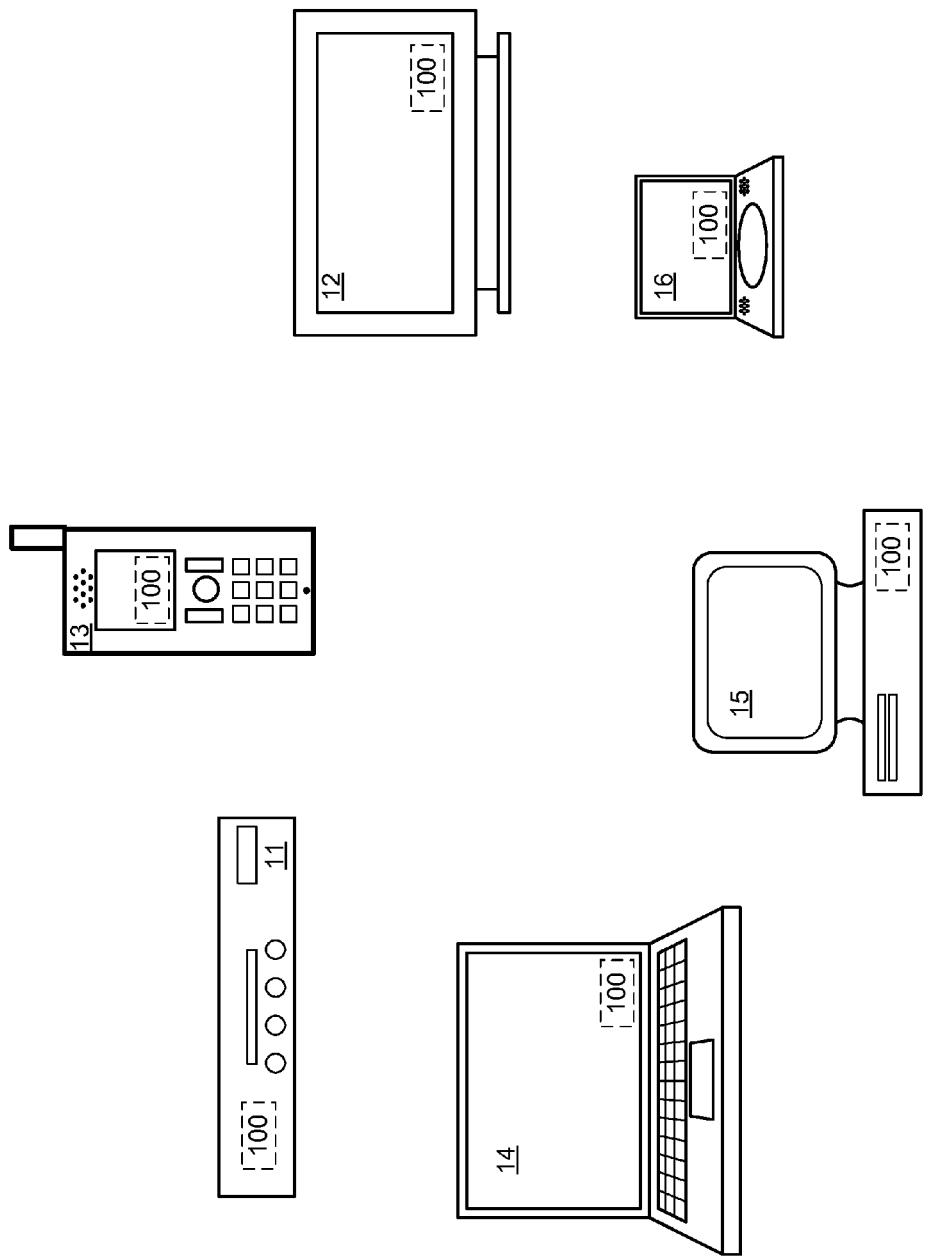
FIG. 1 presents a pictorial representation of example devices 11-16 that can include a processing system 100 in accordance with an embodiment of the present invention.

FIG. 1 presents a pictorial representation of example devices 11-16 that can include a processing system 100 in accordance with an embodiment of the present invention. In particular, these example devices include digital video recorder/set top box 11, television or monitor 12, wireless telephony device 13, computers 14 and 15, personal video player 16, or other devices that include a processing system 100.

A processing system includes a memory module that includes a register space for storing a plurality of register data in a plurality of registers and secure access data corresponding to the register space. A register arbitration module operates to receive a request to access one of registers from a client module; retrieve secure access data corresponding to the client to determine if the client is trusted; and to grant the request to access the register if the client is trusted. If the client is not trusted, the register arbitration module retrieves secure access data to determine if the register is non-secured for the clients. The register arbitration module grants the request to access the register when the register is non-secured for the client.

In this fashion, the arbitration module can help prevent unauthorized access to the register space to prevent tampering and/or unauthorized copying. Processing system 100 will be described in greater detail in conjunction with FIGS. 2-11, including several optional functions and features.

Figure 2:
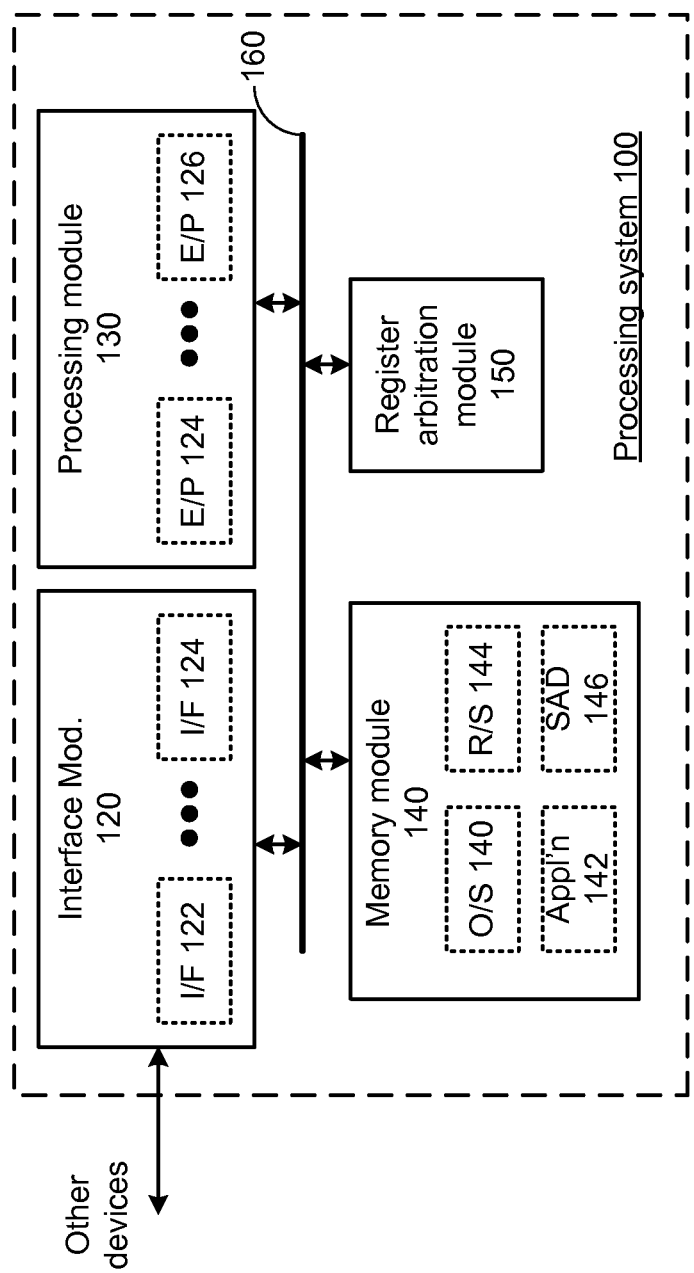
FIG. 2 presents a block diagram representation of a processing system 100 in accordance with an embodiment of the present invention.

FIG. 2 presents a block diagram representation of a processing system 100 in accordance with an embodiment of the present invention. In particular, processing system 100 includes interface module 120, processing module 130, memory module 140, register arbitration module 150, and bus 160 such as an I²C bus or other bus. While a particular bus architecture is shown, alternative architectures using direct connectivity between one or more modules and/or additional buses can likewise be implemented in accordance with the present invention. In an embodiment of the present invention, processing system 100 is implemented via a system on a chip integrated circuit. Further, processing system 100 can include one or more additional modules that are not specifically shown.

Memory module 130 optionally stores an operating system 140 such as a Linux, Mac OS, MS Windows, Solaris or other operating system and one or more applications 142 to be executed by processing system 100. In addition, the memory module 140 includes a register space 144 having a plurality of registers and secure access data 146 that is used by register arbitration module to arbitrate requests for accessing the register space. While not specifically shown, the memory module 130 can store program files and other data files, system data, buffers, drivers, utilities and other system programs, and other data. Memory module 140 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information.

The processing module 130 can be implemented using a single processing device or a plurality of processing devices such as embedded processors 132 and 134. Such a processing device may be a microprocessor, co-processors, a microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 140. Note that when the processing module 130 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Interface 120 includes one or more interfaces to other devices that are either included or coupled to the device that hosts processing system 100. These interfaces 122, 124, etc, can include can include a personal computer interface (PCI), personal computer memory card international association (PCMCIA) interface, universal serial bus (USB) interface an Ethernet interface, Firewire (IEEE 1394) interface, small computer system interface (SCSI), a device test interface such as a joint test action group (JTAG) interface, or other interface, either standard or proprietary. While not specifically shown, the interface module 120 can include other serial or parallel interfaces to other devices or modules of processing system 100.

As introduced in conjunction with FIG. 1, register arbitration module 150 operates to receive a request to access one of the registers of register space 144 from a client module, such as interface modules (122, 124, . . . ) or embedded processors (132, 134, . . . ). Register arbitration module 150 retrieves secure access data 146 corresponding to the particular client that originated the request to determine if the client is either trusted or untrusted. Register arbitration module 150 grants the request to access the register if the client is trusted. If however the client is not trusted, the register arbitration module 150 evaluates further secure access data 146 to determine if the register is secured or non-secured for the particular client making the request. The register arbitration module 150 grants the request to access the register when the register is non-secured for the client. Otherwise the access is denied.

In an embodiment of the present invention, register arbitration module 150 can be implemented via a state machine, digital logic circuitry or other hardware to enhance the security of processing system 100. However, in alternative embodiments, software or firmware can be used in the implementation of register arbitration module 150. It should be noted that register arbitration module 150 can be implemented as a standalone device or as part of a memory manager or other module.

Further details regarding the operation of register arbitration module 150 and including optional functions and features and optional formats of register space 144 and secure access data 146 are presented in conjunction with the example discussed in association with FIGS. 3-5.

This example considers the case where register space 144 is divided into M registers as shown in FIG. 3. Each register includes N units that can each be separately addressable memory locations as shown in FIG. 4. Register arbitration module 150 filters register access requests from multiple clients, allowing these clients to share the register space. The device contains C clients. The clients can include embedded CPU's, PCI Host, USB Host, I²C Host, JTAG, any of the interfaces (122, 124, . . . ), embedded processors (132, 134, . . . ) or other mechanisms with access to the register space 144.

Secure access data 146 shown in FIG. 5 includes client status data 147 that categorizes each client as either trusted or untrusted. In particular, client status data 147 can include C bits of data that represent the categorization of each client device. Further, secure access data 146 further includes filter data for each of the C clients that designates each register as being either secure or non-secure for that client. Registers designated as secure require protection from untrusted clients. Registers designates as non-secure do not require protection.

In an embodiment of the present invention the filter data for the ith client includes M bits of data that represent the designation of each register for that client device. While this configuration provides flexibility in having registers be secure for some clients and non-secure for other clients, it should be noted that in other examples, the designation of a register as either secure or non-secure can be made globally on behalf of all clients, rather than the client-by-client basis described above.

The register arbitration module 150 provides a central hardware mechanism responsible for arbitrating register access requests, such as register read and register write requests from all clients and enumerating the address of the targeted register space. All clients can be arbitrated equally using a balanced arbitration scheme. In an embodiment of the present invention, the N units of each of the M registers are not uniquely identified for purposes of security. A request to access any one of the N units of the ith register is treated similarly as a request for any or all of the remaining units.

In a mode of operation, the register arbitration module 150 receives a request to access a register of register space 144 that includes an address of one or more of the addressable memory units of that register. The register arbitration module 150 determines the particular register that corresponds to the request based on the address or addresses.

In operation, the register arbitration module 150 evaluates the secure access data 146 to determine if the client making the request is trusted. If so, the read or write operation is allowed to be complete unhindered. If however the client is untrusted, the targeted address is decoded to determine the register to be accessed. The M filter bits for the current client are evaluated to determine if the register to be accessed is designated as secure or non-secure for that client. If the decoded filter bit indicates that the targeted address is a secure register, the operation is discarded. For example, read commands can be returned with NULL data. Write commands can be discarded. If however the decoded filter bit indicates that the targeted address is a non-secure register, the operation is allowed to be complete unhindered.

Figure 6:
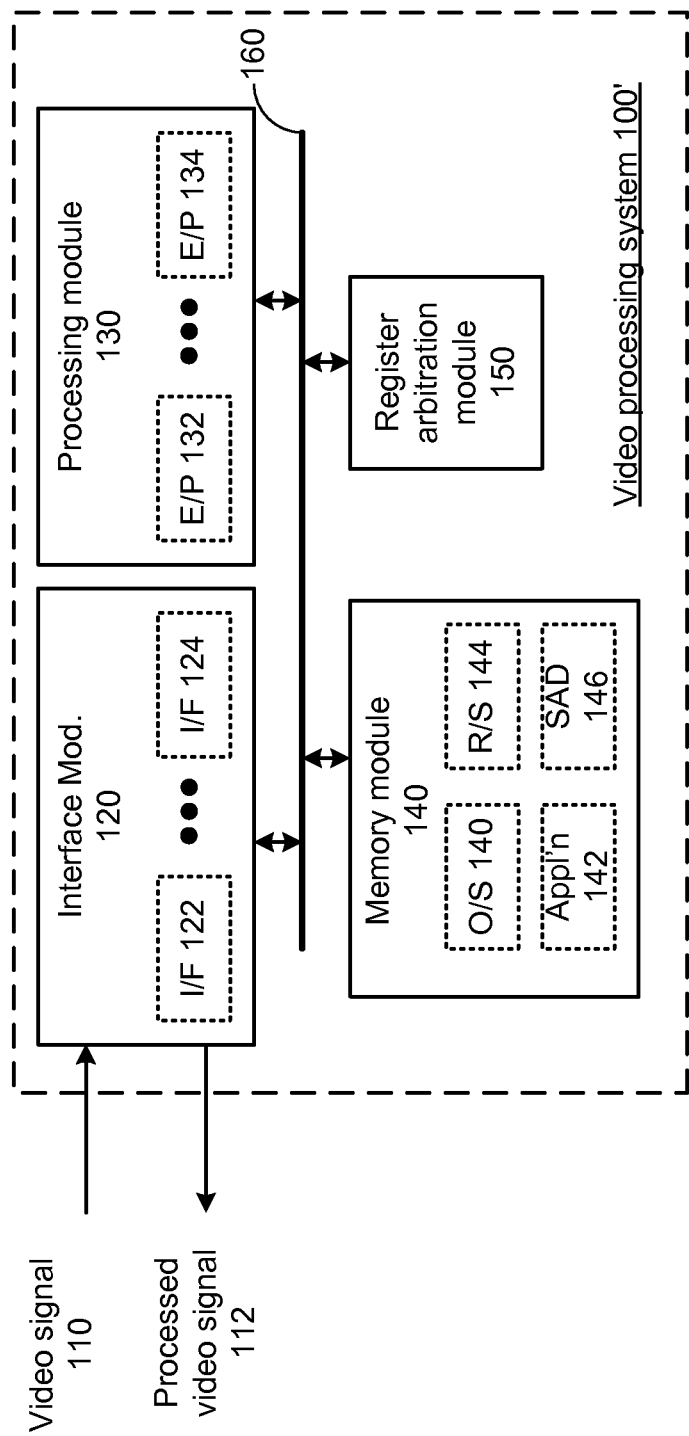
FIG. 6 presents a block diagram representation of a video processing system 100' in accordance with a further embodiment of the present invention.

FIG. 6 presents a block diagram representation of a video processing system 100' in accordance with a further embodiment of the present invention. In particular, video processing system 100' includes the elements of processing system 100 that are referred to by common reference numerals. In addition, the video processing system 100' can be implemented via one or more routines running on processing module 130 or a dedicated video encoding or decoding engine included as one or more embedded processor of processing module 130.

For example, the application 142 can include one or more video processing applications executed by the processing module 130. Interface module 120 receives a video signal 110 and outputs a processed video signal 112 generated by the video processing application based on an encoding of the video signal 110, a decoding of the video signal 110 and/or a transcoding of the video signal 110. While referred to as video signals, video signal 110 and processed video signal 112 can each include an associated audio component. As used herein, transcoding can include transrating, transcrypting, and/or transcaling the video signal 110 to generate processed video signal 112 in addition to transcoding the video signal 110 from one encoded video format into another encoded video format (MPEG1,2,4 to H.264, etc.) to form processed video signal 112. Transcoding can further include transcoding the audio portion of video signal 110 to a different sample rate, encoding standard or other digital format, stereo to mono, etc.

Interface module 120 can receive video signal 110 via a wireless receiver via a WLAN, Bluetooth connection, infrared connection, wireless telephony receiver or other wireless data connection, or a wired modem or other network adaptors that uses a wired receiver or other device to receive the decrypted signal from a LAN, the Internet, cable network, telephone network or other network or from another device. Interface module 120 can also receive video signal 110 in accordance with an Ethernet protocol, a memory card protocol, USB protocol, Firewire (IEEE 1394) protocol, SCSI protocol, PCMCIA protocol, or other protocol either standard or proprietary.

Video signal 110 and processed video signal 112 can each be analog or digital video signals in any of a number of video formats with or without an associated audio component. Such analog video signal can include formats such as National Television Systems Committee (NTSC), Phase Alternating Line (PAL) or Sequentiel Couleur Avec Memoire (SECAM). Such digital video formats can include formats such as H.264, MPEG-4 Part 10 Advanced Video Coding (AVC) or other digital format such as a Moving Picture Experts Group (MPEG) format (such as MPEG1, MPEG2 or MPEG4), Quicktime format, Real Media format, Windows Media Video (WMV), Audio Video Interleave (AVI), high definition media interface (HDMI) or another digital video format, either standard or proprietary.

Video signal 110 and/or processed video signal 112 can be generated in association with a set-top box, television receiver, personal computer, cable television receiver, satellite broadcast receiver, broadband modem, 3G transceiver, a broadcast satellite system, internet protocol (IP) TV system, the Internet, a digital video disc player, a digital video recorder, or other video device. In an embodiment of the present invention, the video signals 110 and or 112 can include a broadcast video signal, such as a television signal, high definition television signal, enhanced high definition television signal or other broadcast video signal that has been transmitted over a wireless medium, either directly or through one or more satellites or other relay stations or through a cable network, optical network or other transmission network. In addition, the video signal 110 and/or processed video signal 112 can be generated from a stored video file, played back from a recording medium such as a magnetic tape, magnetic disk or optical disk, and can include a streaming video signal that is transmitted over a public or private network such as a local area network, wide area network, metropolitan area network or the Internet. In operation, video processing system 100' is coupled to the receiving module 100 to encode, transrate, transcrypt, transcale and/or otherwise transcode one or more of the video signals 110 to form processed video signal 112.

FIG. 7 presents a block diagram representation of a video encoding system 200 in accordance with an embodiment of the present invention. In particular, video encoding system 200, such as video processing system 100', operates in accordance with many of the functions and features of the H.264, MPEG-4 Part 10 Advanced Video Coding (AVC), or other digital format such as a Moving Picture Experts Group (MPEG) format (such as MPEG1, MPEG2 or MPEG4), VC-1 (SMPTE standard 421M), Quicktime format, Real Media format, Windows Media Video (WMV), Audio Video Interleave (AVI), high definition media interface (HDMI) or another digital video format, either standard or proprietary or other video format, to encode video input signals 110 to form processed video signal 112.

FIG. 8 presents a block diagram representation of a video decoding system 202 in accordance with an embodiment of the present invention. In particular, video decoding system 202, such as video processing system 100', operates in accordance with many of the functions and features of the H.264, MPEG-4 Part 10 Advanced Video Coding (AVC), or other digital format such as a Moving Picture Experts Group (MPEG) format (such as MPEG1, MPEG2 or MPEG4), VC-1 (SMPTE standard 421M), Quicktime format, Real Media format, Windows Media Video (WMV), Audio Video Interleave (AVI), high definition media interface (HDMI) or another digital video format, either standard or proprietary or other video format, to decode video input signals 110 to form processed video signal 112.

FIG. 9 presents a block diagram representation of a video transcoding system 204 in accordance with an embodiment of the present invention. In particular, video transcoding system 204, such as video processing system 100', operates in accordance with many of the functions and features of the H.264, MPEG-4 Part 10 Advanced Video Coding (AVC), or other digital format such as a Moving Picture Experts Group (MPEG) format (such as MPEG1, MPEG2 or MPEG4), VC-1 (SMPTE standard 421M), Quicktime format, Real Media format, Windows Media Video (WMV), Audio Video Interleave (AVI), high definition media interface (HDMI) or another digital video format, either standard or proprietary or other video format, to transcode video signal 110 to form processed video signal 112.

Figure 10:
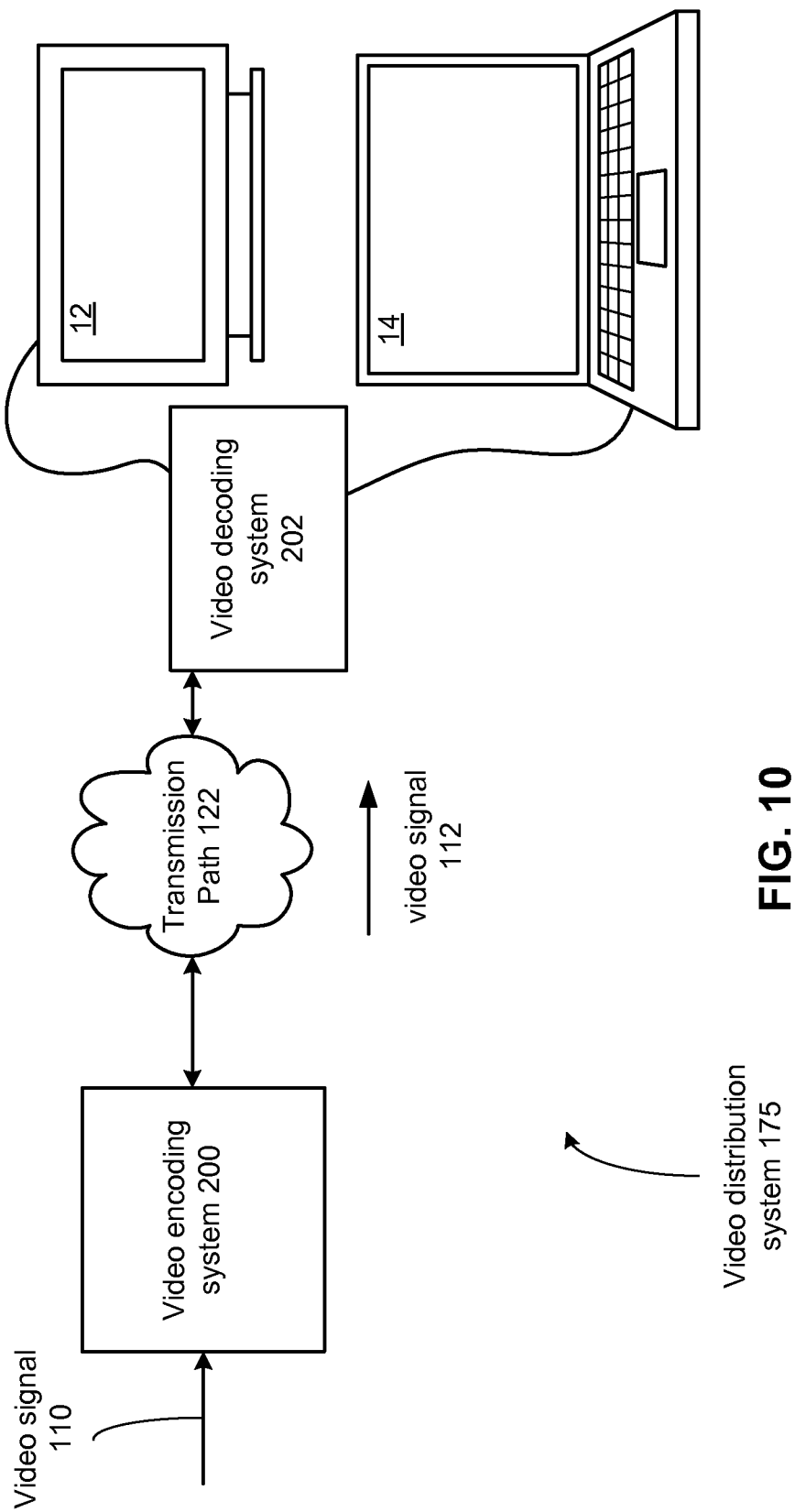
FIG. 10 presents a block diagram representation of a video distribution system 175 in accordance with an embodiment of the present invention.

FIG. 10 presents a block diagram representation of a video distribution system 175 in accordance with an embodiment of the present invention. In particular, processed video signal 112 is transmitted via a transmission path 122 to a video decoder 202. Video decoder 202, in turn can operate to decode the processed video signal 112 for display on a display device such as television 10, computer 20 or other display device.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a USB protocol, high-definition multimedia interface (HDMI) protocol an Ethernet protocol or other high speed protocol.

Figure 11:
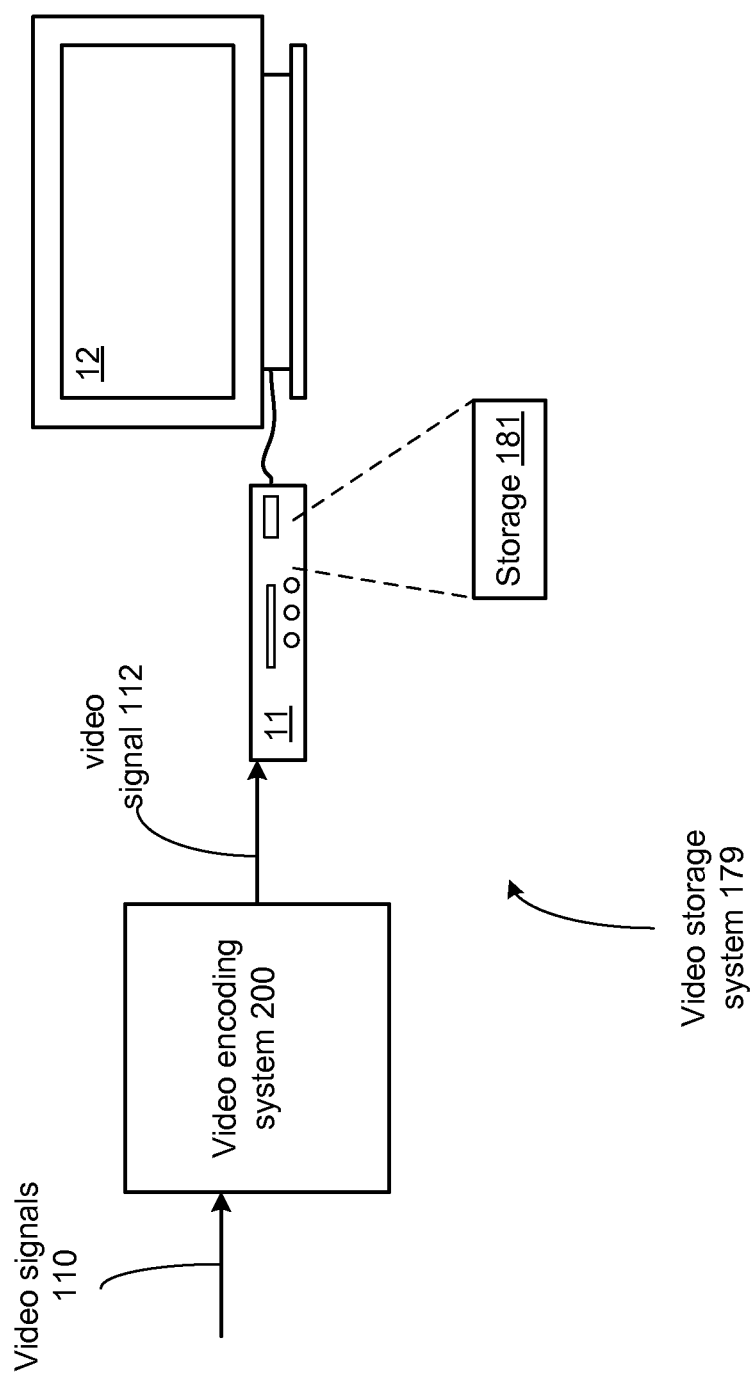
FIG. 11 presents a block diagram representation of a video storage system 179 in accordance with an embodiment of the present invention.

FIG. 11 presents a block diagram representation of a video storage system 179 in accordance with an embodiment of the present invention. In particular, device 11 is a set top box with built-in digital video recorder functionality, a stand alone digital video recorder, a DVD recorder/player or other device that stores the processed video signal 112 in storage 181 for display on video display device such as television 12. Storage 181 can include a hard disk drive optical disk drive or other disk drive, read-only memory, random access memory, volatile memory, non-volatile memory, static memory, dynamic memory, flash memory, cache memory, and/or any device that stores digital information. Storage 181 can be integrated in the device 11 or coupled to the device 11 via a network, wireline coupling or other connection.

While video encoder 200 is shown as a separate device, it can further be incorporated into device 11. While these particular devices are illustrated, video storage system 179 can include a hard drive, flash memory device, computer, DVD burner, or any other device that is capable of generating, storing, decoding and/or displaying a video stream 220 in accordance with the methods and systems described in conjunction with the features and functions of the present invention as described herein.

FIG. 12 presents a flowchart representation of a method in accordance with an embodiment of the present invention. In particular a method is presented for use in conjunction with one or more functions and features described in conjunction with FIGS. 1-8. In step 400, a request to access one of the plurality of registers is received from at least one of a plurality of clients. In step 402, secure access data corresponding to the at least one of the plurality of clients is retrieved to determine when the at least one of the plurality of clients is trusted as shown in decision block 404. In step 406, the request to access the one of the plurality of registers is granted when the at least one of the plurality of clients is trusted. When the at least one of the plurality of clients is not trusted, secure access data is evaluated to determine when the one of the plurality of registers is non-secured for the at least one of the plurality of clients as shown in step 408 and decision block 410. The method also proceeds to grant the request to access the one of the plurality of registers in step 406 when the one of the plurality of registers is non-secured for the at least one of the plurality of clients. In step 412, the request to access the one of the plurality of registers is denied when the one of the plurality of registers is not non-secured for the at least one of the plurality of clients.

In an embodiment of the present invention, when the request to access the one of the plurality of registers includes a write command and write data, step 412 can include discarding the write command and the write data. When the request to access the one of the plurality of registers includes a read command, step 412 can include returning null read data in response to the read command.

Each of the plurality of registers can include a plurality of addressable memory units. The request to access the one of the plurality of registers can include an address of at least one of the plurality of addressable memory units of the at least one of the plurality of registers. The method can determine that the request corresponds to the one of the plurality of registers, based on the address of at least one of the plurality of addressable memory units.

The plurality of client devices can include a bus host device; a device test interface; and/or an external device interface. The plurality of clients can include an embedded processor that executes a video processing application. The interface unit receives a video signal and outputs a processed video signal generated by the video processing application based on: an encoding of the video signal; a decoding of the video signal; or a transcoding of the video signal.

While particular combinations of various functions and features of the present invention have been expressly described herein, other combinations of these features and functions are possible that are not limited by the particular examples disclosed herein are expressly incorporated within the scope of the present invention.

As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled".

As the term module is used in the description of the various embodiments of the present invention, a module includes a functional block that is implemented in hardware, software, and/or firmware that performs one or more functions such as the processing of an input signal to produce an output signal. As used herein, a module may contain sub-modules that themselves are modules.

Thus, there has been described herein an apparatus and method, as well as several embodiments including a preferred embodiment, for implementing a processing system and video processing system along with a register arbitration module for use therewith and with other processing systems. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A processing system comprising:
   a plurality of clients including at least one embedded processor and at least one interface device:
   a memory module that includes a register space for storing data in a plurality of secured registers and further memory to separately store secure access data corresponding to the register space for each of the plurality of clients, wherein the secure access data indicates a security status for each of the plurality of secured registers on a client specific basis having an individual security status for each of the plurality of clients, and wherein each of the plurality of secured registers includes a plurality of memory units that are individually addressable;
   a register arbitration module, coupled to the memory module and the plurality of clients, wherein the register arbitration module:
      receives a request to access one of the plurality of memory units of one of the plurality of secured registers from at least one of the plurality of clients;
      retrieves the security status corresponding to the one of the plurality of secured registers to determine when the one of the plurality of secured registers is non-secured for the at least one of the plurality of clients corresponding to the request; and
      grants the request to access the one of the plurality of memory units of the one of the plurality of secured registers when the one of the plurality of secured registers is non-secured for the at least one of the plurality of clients corresponding to the request;
   wherein the plurality of memory units of the one of the plurality of secured registers are not uniquely identified for purposes of security so that the request to access the one of the plurality of memory units of the one of the plurality of secured registers is treated similarly as a request to access others of the plurality of memory units of the one of the plurality of secured registers.

2. The processing system of claim 1, wherein the register arbitration module further:
   denies the request to access the one of the plurality of memory units of the one of the plurality of secured registers when the one of the plurality of secured registers is not non-secured for the at least one of the plurality of clients.

3. The processing system of claim 2 wherein when the request to access the one of the plurality of memory units of the one of the plurality of secured registers includes a write command and write data, denying the request to access the one of the plurality of secured registers includes discarding the write command and the write data.

4. The processing system of claim 2 wherein when the request to access the one of the plurality of memory units of the one of the plurality of secured registers includes a read command, denying the request to access the one of the plurality of secured registers includes returning null read data in response to the read command.

5. The processing system of claim 1
   wherein the request to access the one of the plurality of memory units of the one of the plurality of secured registers includes an address of the one of the plurality of memory units; and
   wherein the register arbitration module determines that the request corresponds to the one of the plurality of secured registers, based on the address of the one of the plurality of memory units.

6. The processing system of claim 1, wherein the secure access data indicates a first secured register of the plurality of secured registers is non-secured for a first client of the plurality of clients of the plurality of secured registers and a second register is not non-secured for the first client of the plurality of clients.

7. The processing system of claim 1 wherein a processing module executes a video processing application;
   wherein, the at least one interface device receives a video signal and outputs a processed video signal generated by the video processing application based on at least one of:
   an encoding of the video signal;
   a decoding of the video signal; and
   a transcoding of the video signal.

8. The processing system of claim 7 wherein the processing module includes at least one of:
   an encoding engine, coupled to the at least one interface device, for encoding the video signal; and
   an decoding engine, coupled to the at least one interface device, for decoding of the video signal.

9. A method comprising:
   storing data in a plurality of secured registers and secure access data in another portion of memory for each of a plurality of clients including at least one embedded processor and at least one interface device, wherein the secure access data indicates a security status for each of the plurality of secured registers on a client specific basis having an individual security status for each of the plurality of clients, and wherein each of the plurality of secured registers includes a plurality of memory units that are individually addressable;
   receiving a request to access one of the plurality of memory units of one of the plurality of secured registers from at least one of the plurality of clients;
   retrieving the security status corresponding to the one of the plurality of secured registers to determine when the one of the plurality of secured registers is non-secured for the at least one of the plurality of clients corresponding to the request; and
   granting the request to access the one of the plurality of memory units of the one of the plurality of secured registers when the one of the plurality of secured registers is non-secured for the at least one of the plurality of clients corresponding to the request;
   wherein the plurality of memory units of the one of the plurality of secured registers are not uniquely identified for purposes of security so that the request to access the one of the plurality of memory units of the one of the plurality of secured registers is treated similarly as a request to access others of the plurality of memory units of the one of the plurality of secured registers.

10. The method of claim 9 further comprising:
denying the request to access the one of the plurality of memory units of the one of the plurality of secured registers when the one of the plurality of secured registers is not non-secured for the at least one of the plurality of clients.

11. The method of claim 10 wherein when the request to access the one of the plurality of secured registers includes a write command and write data, denying the request to access the one of the plurality of memory units of the one of the plurality of secured registers includes discarding the write command and the write data.

12. The method of claim 10 wherein when the request to access the one of the plurality of memory units of the one of the plurality of secured registers includes a read command, denying the request to access the one of the plurality of secured registers includes returning null read data in response to the read command.

13. The method of claim 9
wherein the request to access the one of the plurality of memory units of the one of the plurality of secured registers includes an address of the one of the plurality of memory units; and
wherein the method further comprises:
determining that the request corresponds to the one of the plurality of secured registers, based on the address of the one of the plurality of memory units.

14. The method of claim 9 wherein the plurality of clients include at least one of: a bus host device; a device test interface; and an external device interface.

15. The method of claim 9 wherein the embedded processor executes a video processing application;
wherein, the at least one interface device receives a video signal and outputs a processed video signal generated by the video processing application based on at least one of:
an encoding of the video signal;
a decoding of the video signal; and
a transcoding of the video signal.

16. A processing system comprising:
a plurality of clients that include an embedded processor and at least one of: a bus host device; a device test interface; and an external device interface:
a memory module that includes a register space for storing data in a plurality of registers and further memory to separately store secure access data corresponding to the register space for each of the plurality of clients, wherein the secure access data indicates a security status for each of the plurality of registers on a client specific basis having an individual security status for each of the plurality of clients, and wherein each of the plurality of registers includes a plurality of memory units that are individually addressable;
a register arbitration module, coupled to the memory module and the plurality of clients, wherein the register arbitration module:
receives a request to access one of the plurality of memory units of one of the plurality of registers from at least one of the plurality of clients;
retrieves the security status corresponding to the one of the plurality of registers to determine when the one of the plurality of registers is non-secured for the at least one of the plurality of clients corresponding to the request; and
grants the request to access the one of the plurality of memory units of the one of the plurality of registers when the at of the plurality of registers is non-secured for the at least one of the plurality of clients corresponding to the request;
wherein the plurality of memory units of the one of the plurality of registers are not uniquely identified for purposes of security so that the request to access the one of the plurality of memory 1 similarly request to access others of the plurality of memory units of the one of the plurality of registers.

17. The processing system of claim 16, wherein the register arbitration module further:
denies the request to access the one of the plurality of memory units of the one of the plurality of registers when the one of the plurality of registers is not non-secured for the at least one of the plurality of clients.

18. The processing system of claim 17 wherein when the request to access the one of the plurality of registers includes a write command and write data, denying the request to access the one of the plurality of memory units of the one of the plurality of registers includes discarding the write command and the write data.

19. The processing system of claim 17 wherein when the request to access the one of the plurality of memory units of the one of the plurality of registers includes a read command, denying the request to access the one of the plurality of memory units of the one of the plurality of registers includes returning null read data in response to the read command.

20. The processing system of claim 16
wherein the request to access the one of the plurality of memory units of the one of the plurality of registers includes an address of the one of the plurality of memory units; and
wherein the register arbitration module determines that the request corresponds to the one of the plurality of registers, based on the address of the one of the plurality of memory units.

* * * * *